United States Patent Office 3,396,790
Patented Aug. 13, 1968

3,396,790
SELECTIVE PLUGGING OF PERMEABLE
WATER CHANNELS IN SUBTERRANEAN
FORMATIONS
Ben A. Eaton, Anaheim, Calif., assignor to Union Oil
Company of California, Los Angeles, Calif., a corporation of California
Filed July 11, 1966, Ser. No. 564,142
20 Claims. (Cl. 166—9)

ABSTRACT OF THE DISCLOSURE

A method for selectively plugging the permeable water channels of a subterranean formation in which there is successively introduced into the formation (1) an aqueous solution of a first reactant material rendered more viscous than the subsequently injected liquids by the addition of a viscosity increasing agent, (2) a low viscosity inert aqueous spacer liquid, and (3) a low viscosity aqueous solution containing a second reactant material which on contact will react with the first reactant to produce an insoluble precipitate.

---

This invention relates to the treatment of subterranean formations of nonuniform permeability, and more particularly concerns an improved method for selectively plugging the more permeable water flow channels of an earth formation. The method of this invention is especially useful in promoting more uniform fluid injection patterns, such as are desirable in the secondary recovery of petroleum by displacement with flood water, and for water shutoff in producing wells.

Since only a portion of the oil contained in a petroleum reservoir can be recovered by primary methods, it has become conventional practice to employ various secondary and tertiary recovery techniques to recover additional quantities of oil not otherwise economically recoverable. Of the various secondary and tertiary recovery methods presently available, one of the most widely practiced techniques is the displacement of the oil from the formation by a displacement fluid injected for that purpose, commonly called water flooding. Normally, in carrying out the water flooding process, a series of input wells approximately equidistant from a producing well are drilled into and opened to the same oil producing strata. The injection well locations with reference to the production well are selected to afford a desired flood pattern, the selected pattern depending in part on field conditions, the location of existing wells, and the operator's preference. Aqueous displacement fluid, such as water, brine, or viscous water, is forced into the input wells under pressure, and out into the surrounding oil-bearing strata and towards the producing well or wells. While water flooding has been rather widely adopted in recent years, it is not without considerable operating problems and economic limitations, particularly those resulting from low oil recoveries in proportion to the amount of water injected.

One of the principal problems encountered in the water flooding operation is water breakthrough from the flood front to the producing well relatively early in the displacement process, and rapidly increasing producing water/oil ratios following this initial water breakthrough. These difficulties are caused by the aqueous displacing medium channeling and/or fingering through the oil-bearing structure to the producing well, thus bypassing large zones of the oil-bearing strata. While a more uniform flood front with reduced fingering can be obtained with a displacement fluid rendered viscous by the addition of various water soluble polymers or other materials capable of imparting higher viscosity to the flood water, viscous water flooding alone is not fully effective in all formations. The reason for the lack of suitable recovery of oil in these permeable strata is due, in part, to the peculiar structure of the oil-bearing strata. Underground oil reservoirs, in most cases, consist of layers of sand or rock and, since no reservoir rock is perfectly uniform in composition and structure, the permeability will vary across the rock face or stratum.

In the normal flooding operation the ideal situation for maximum recovery of oil is obtained when the driven fluid is permitted to build up in a wide bank in front of the driving fluid which moves uniformly towards the producing well. To keep this bank of oil intact, and constantly moving toward the producing well, a substantially uniform permeability must exist throughout the strata. If this uniform permeability does not exist or is not provided, the flooding fluid will seek the areas of high permeability, and channeling occurs with the consequent loss of some driving fluid energy and appearance of excess displacement fluid in the producing well. Moreover, as the more permeable strata are depleted, the water has a tendency to follow these channels and further increase consumption of flooding water to the point where the process becomes economically undesirable. This maximum limit, in terms of recovered oil, can be as high as 100 barrels of driving fluid per barrel of oil. It is of course desirable to operate at much lower water to oil ratios, and normally 5 to 10 barrels of water per barrel of recovered oil is considered an acceptable operating condition.

More uniform flood fronts can be obtained in formations of nonuniform permeability by control or adjustment of the permeability of the more permeable strata of the formation in the flood zone. A number of methods of reducing the permeability of these permeable strata have been proposed, including the injection of plugging materials into these strata which at least partially plug the permeable zones so as to achieve more uniform permeability. Some of these methods of permeability adjustment accomplish the plugging step by the in situ formation of plugging material in the permeable strata by injection of one or more reactant substances which chemically react to form a solid residue. The reactant substance can react with a substance naturally occurring in the structure, or with a second reactant material injected for that purpose. These reactant substances include various hydraulic cements, precipitate forming materials, and monomers or prepolymers which are polymerizable under formation conditions.

As an example of these plugging methods, U.S. 2,272,-672 discloses the injection of solutions which on introduction into the permeable strata react to produce a precipitate which obstructs the pores and provides a limited control of porosity. Similarly, U.S. 2,238,930 discloses a method of sealing the pores of earth strata utilizing a solution of metal compound capable of forming an insoluble precipitate when the solution is brought into contact with the formation, a stabilizing agent being employed to prevent premature precipitation. U.S. 2,747,670 adn 2,807,324 disclose the injection of reactants which form single and double precipitates. In both of these methods the reactant materials in aqueous solution are separately injected, these solutions being separated by an inert spacer fluid. The volume of inert spacer fluid is adjusted to control the theoretical point within the formation at which the precipitation reaction occurs, and at which point the plug will be formed. Thus, by proper control of the volume of inert spacer fluid, it is theoretically possible to obtain a controlled selective plugging, or adjustment of permeability, at a specific desired distance from the well in a manner that provides a smooth uniform permeability profile throughout the entire area surrounding the input well.

While the foregoing methods of permeability control in a water flooding operation are in many instances sufficiently effective to produce an increase in oil recovery, many reservoirs completely fail to respond to treatment and the incremental oil recovery in others is undesirably small. Further, even with the most successful of the prior art selective plugging treatments, oil recoveries are far from complete.

Another problem associated with the production of oil from oil-bearing formations containing highly permeable water channels communicating the well with a water zone is the intrusion of water into the well. Not only does this water intrusion cause production and disposal problems, but more importantly the benficial effect of the natural water drive is at least in part lost thereby adversely affecting oil recovery. It is advantageous to at least partially plug the more permeable water channels so as to render the formation more uniformly permeable and to increase the sweep efficiency of the water drive, or alternatively to shut off the water intrusion. Heretofore, selective plugging of these water channels has presented great difficulty, it being necessary to effect at least a partial water plug without adversely affecting the permeability of the formation for oil production.

Accordingly, a principal object of this invention is to provide a method for controlling the permeability of a subterranean formation of nonuniform permeability. Another object is to provide a method of selectively plugging the more permeable water channels of a subterrainean formation. Another object is to provide an improved water flooding process wherein the displacement fluid pattern is controlled by selectively plugging the permeable water channels. A still further object is to provide a method of controlling water intrusion into a producing well.

These and related objects, which will be apparent from the following description, can be realized in accordance with this invention by sequentially injecting a first reactive chemical in viscous aqueous solution followed by a low viscosity inert spacer and then by a second low viscosity aqueous solution containing a second reactive chemical capable of forming a solid precipitate on contact with the first reactive agent. The injected solutions preferentially pass into those stratas having higher water permeabilities whereupon they become admixed and react to form solid precipitates which are deposited in higher permeability zones causing them to become at least partially plugged. As the permeability of these more permeable zones is reduced, the injected solutions tend to pass to a greater extent into the less permeable zones causing partial plugging therein. As a consequence, a formation containing strata or zones of nonuniform permeability with respect to water is rendered more uniformly permeable. The permeability control technique of this invention is particularly useful in conjunction with a water flood, wherein the permeability adjusting treatment can be periodically performed as necessary to achieve the desired uniformity. In another embodiment of the invention, the aforementioned plugging solutions are injected into a producing well in order to plug permeable water channels in communication therewith.

The beneficial effect of the treatment of this invention in a typical water flooding process is illustrated in the drawings, of which:

Figure 1:
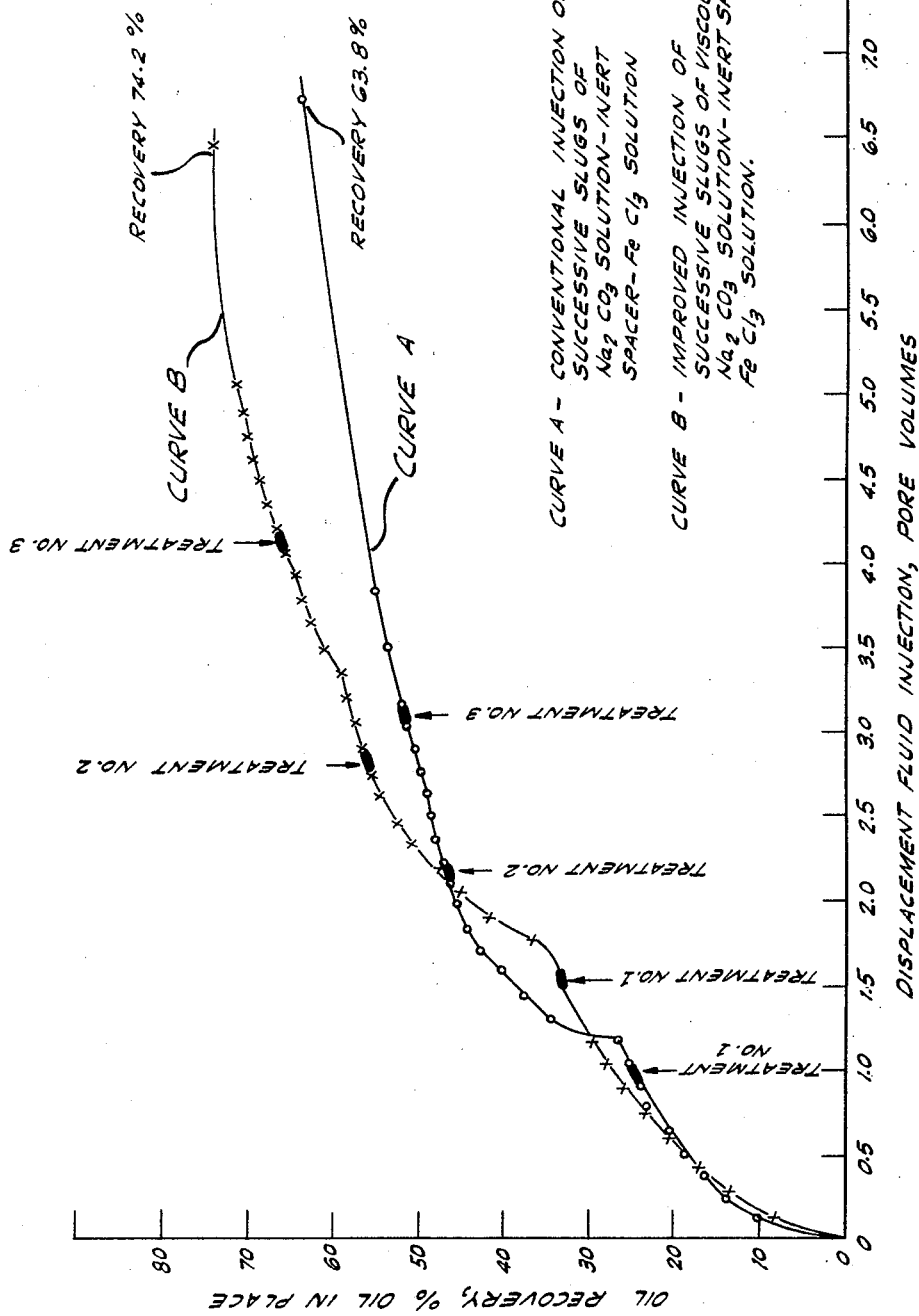
FIGURE 1 is a graphical representation of oil recovery as a function of the volume of displacement fluid injected in a laboratory simulation of a water flood using a heretofore preferred selective plugging treatment and a water flood using the selective plugging treatment of this invention.
Figure 2:
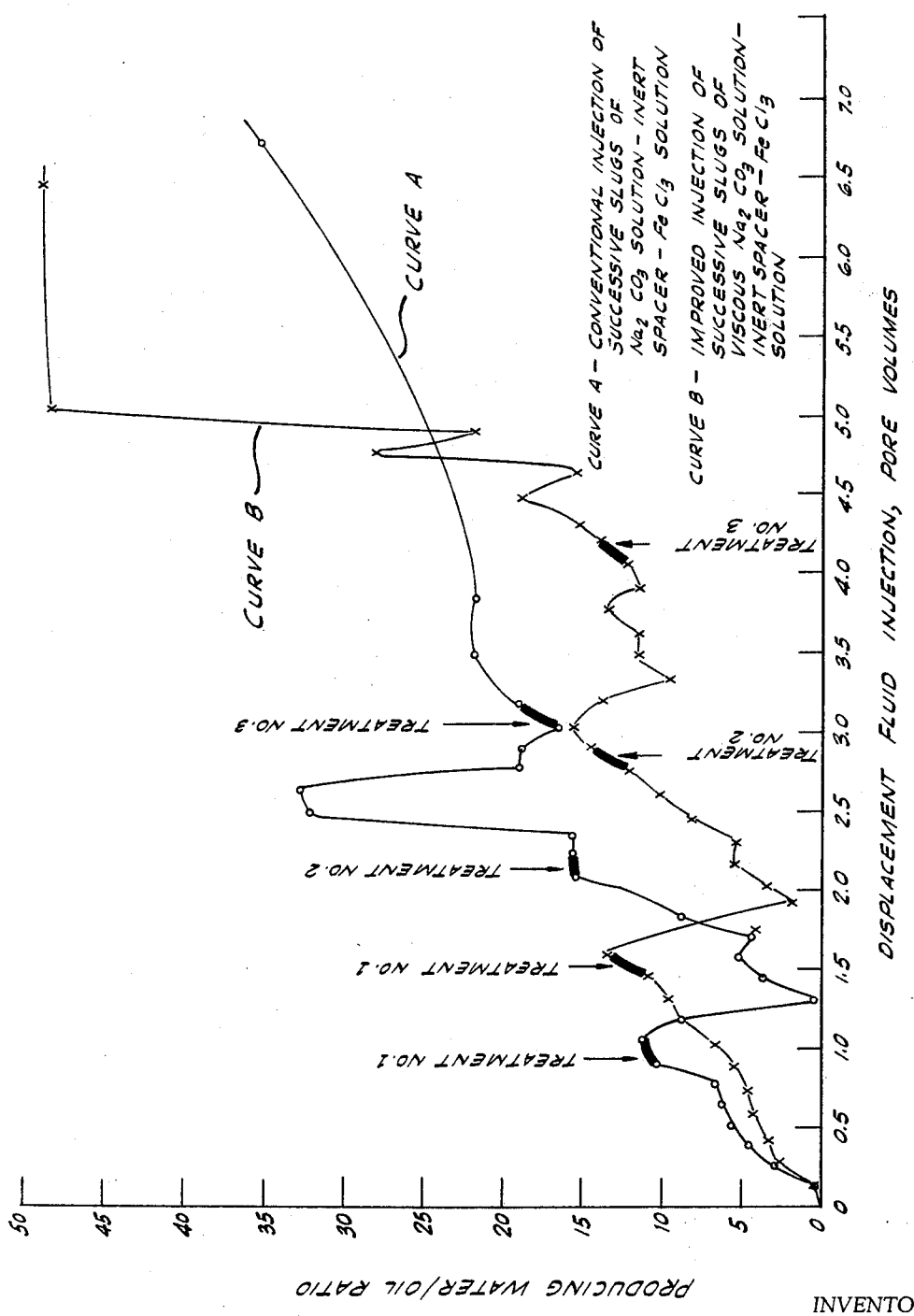
FIGURE 2 is a graphical representation of the producing water/oil ratio as a function of the volume of displacement fluid injected in a laboratory simulation of a water flood using a heretofore preferred selective plugging treatment and a water flood using the selective plugging treatment of this invention.

These data are obtained from the laboratory tests described in Examples 1 and 2, which follow.

With the heretofore conventional method of permeability adjustment within the formation by the separate injection of reactive chemical solutions, a first aqueous chemical solution is injected into the well followed directly by a quantity of an inert spacing fluid. These two solutions are immediately followed by the introduction of a third solution containing a chemical component which on contact with the reactive component of the first solution will cause a precipitate to be formed. These reactive solutions and the spacing medium after introduction into the well are followed by pressurized driving fluid, permitting them to move out into the formation in more or less circular bands from the injection or input well, the symmetry of the bands depending upon the uniformity of the structure. The injected solutions tend to perferentially enter the more permeable water channels, the following reactive solution fingering through the spacer fluid and admixing with the first reactive fluid whereupon a precipitate is formed. As the bands of solution move outwardly, they gradually approach each other as the spacing medium band narrows due to geometric relationship of the distance of the band from the well.

Admixture of the reactive chemicals within the permeable water channels is promoted by introducing the first reactive chemical in a viscous aqueous solution and following this injection with relatively low viscosity spacer and second reactive solutions. Because of this difference in viscosities, the spacer fluid and the reactive second fluid tend to finger into the high viscosity preceding fluid to an increased extent in the permeable regions. As the most permeable channels become partially plugged, fingering into other somewhat less permeable zones increases so that ultimately the structure is rendered more uniformly permeable. Injection of the first reactive chemical in viscous solution has a further beneficial effect in that the viscous fluid has a greater tendency to adhere to the pore walls as the fluid bank advances through the formation, and thus chemically reacts on contact with the following solution.

The first reactive solution can be thickened or rendered viscous by the addition of known viscosity increasing agents, such as fatty acid soaps, alginates, sucrose, glycerine, finely divided clays such as montmorillonite, and a number of water soluble polymers. Of these, the water soluble polymers are generally preferred. Preferred polymers include modified starches, xanthum gum obtained by the fermentation of starch-derived sugar, alkyl and hydroalkyl cellulose derivatives, carboxymethyl cellulose, polyvinyl alcohol, polyvinyl pyrrolidone, polyacrylic acid, polyacrylamide, polystyrene sulfonates, ethylene oxide poymers, the various homologs of these polymers, and copolymers of two more more of these materials, or copolymers of the afrementioned polymers with other polymeric substances.

A preferred polymer is partially hydrolyzed polyacrylamide having between about 2 to about 67 percent of the carboxamide groups hydrolyzed to carboxyl groups, and which is characterized by a molecular weight of at least 500,000 and preferably 1,000,000 or more. With these high molecular weight polyacrylamides, it is possible to obtain aqueous solutions having a desirably increased viscosity with the use of a minimum amount of polymeric ingredient. Further, the viscosity of a standard solution of polymer under controlled conditions is correlated with the molecular weight of the polymer. Accordingly, the hydrolyzed polyacrylamides preferred for use in this invention are characterized by a viscosity of at least 6 centipoises for a 0.5 percent by weight solution thereof in aqueous 4 percent by weight sodium chloride solution at a temperature of 25° C. as determined with an Ostwald viscosimeter.

The term "hydrolyzed" polyacrylamide as employed herein is inclusive of the modified polymers wherein the carboxyl groups are in the acid form and also such polymers wherein the carboxyl groups are in the salt form, provided the salts are water soluble. Thus, for example, the hydrolyzed polyacrylamide can be employed to form a sodium, potassium, or other alkali metal salt, the ammonium salt, or mixed salts of sodium, potassium, magnesium, calcium and the like. The polyacrylamides from which the hydrolyzed polyacrylamides of this invention are derived may be homopolymers of acrylamide or copolymers thereof with up to about 10 percent by weight of other suitable polymerizable vinyl compounds such as vinyl acetate, acrylonitrile, methyl acrylonitrile, vinyl alkyl ether, vinyl chloride, and the like, provided that the copolymers so employed are characterized by water solubility and freedom from cross-linking. Particularly preferred copolymers are those formed by the copolymerization of acrylamide and maleic anhydride or acrylic acid.

An especially preferred commercial partially hydrolyzed polyacrylamide is marketed by the Dow Chemical Company under the trade name "ET–601." Another preferred commercial partially hydrolyzed polyacrylamide is marketed by the Dow Chemical Company under the trade name "Separan."

The first injected viscous aqueous solution is prepared by dissolving suitable quantities of viscosity modifier and first reactive chemical in water, brine or formation water. A bacteriacide can also be added where desired. The proportion of reactive agent to be dissolved in the viscous solution will depend in part upon the particular reactive material employed. Viscosity modifier is added as necessary to render the first solution substantially more viscous than the spacer fluid and the second reactive fluid. In the case where the following fluids exhibit viscosities of approximately 1 centipoise, it is desirable that the viscous solution have a viscosity between about 5 and about 100 centipoises, a preferred viscosity range being from about 12 to about 20 centipoises. Viscosity modifier should be added in sufficient concentration to obtain a solution viscosity within the foregoing range.

A wide variety of water soluble reactants can be used in the practice of this invention. For example, water soluble salts of certain metals and an alkaline substance produce insoluble precipitates. Suitable water soluble salts include the salts of iron, aluminum, calcium, cobalt, nickel, copper, mercury, silver, lead, chromium, zinc, cadmium, and magnesium. The water soluble salts of these metals produce a precipitate of a basic metal compound when brought into contact with an alkaline solution. Exemplary of the alkaline solutions are aqueous solutions of sodium hydroxide, sodium carbonate, sodium borate, sodium bicarbonate, sodium silicate, sodium phosphate, or the potassium or ammonium salts of these anions.

Since the polyvalent metals react with various of the viscosity modifiers, such as the polyacrylamides, to form gelatinous precipitates, it is desirable to admix the alkaline substance with the viscous solution to prevent undesirable precipitation prior to injection into the water permeable channels. Accordingly, a preferred embodiment of this invention encompasses the use of a viscosity modifier reactive with a polyvalent metal to thicken viscous aqueous solution, which also contains the alkaline reactant, and an aqueous polyvalent salt solution as the following or second reactive solution. In this manner additional precipitate is formed to aid in the plugging of the permeable stratas.

In selecting the particular reactants to be used, some consideration is necessary of the type of precipitate desired to be formed by the reactants. Generally, it is desirable to produce a gelatinous type of precipitate which will form an insoluble deposit adherent to the pore walls. Such a precipitate is advantageous in view of the relatively high pressures existing on the driving fluid which in turn will be exerted against the precipitate. While it is indicated above that a wide variety of compounds can be used in effectively carrying out this method, consideration should be given to the selection of appropriate reactants with respect to the strata in which the desired precipitate is expected to be formed as it is well known certain types of strata contain various mineral substances which are capable of reacting with chemical solutions to form precipitates. In addition, the naturally existing brines also contain mineral substances capable of reacting with certain chemical solutions to form undesirable precipitates. To avoid such occurrences, care should be taken to select as the reactant components those chemicals which will be inert to the surrounding strata on introduction into the well.

Although any water soluble reactive chemicals which react to yield a solid precipitate under formation conditions, such as the aforementioned metal salts and alkaline substances, can be employed in the practice of this invention, certain reactant substances have proven particularly successful. One reactant combination useful in many applications is sodium carbonate and ferric chloride. A particularly preferred reactant combination known to form a double precipitate is sodium silicate and ferrous sulfate.

Accordingly, in an especially preferred embodiment of this invention, selective plugging is accomplished by the injection of a first reactant fluid comprising an aqueous solution containing 5 to 20 percent by weight sodium carbonate and sufficient thickener, such as the heretofore disclosed partially hydrolyzed polyacrylamide, to increase the solution viscosity to a value within the range of 5 to 100 centipoises. This solution is followed by an inert spacer fluid, which can be water or brine, and then by a second reactive fluid comprising an aqueous solution of 5 to 30 percent by weight ferric chloride.

In another especially preferred embodiment, the first reactive fluid comprises an aqueous solution of 5 to 25 percent by weight sodium silicate and the necessary amount of thickening agent and the second reactant solution comprises a 5 percent by weight to saturated solution (about 13 percent by weight) of ferrous sulfate.

In the practice of this invention in combination with a conventional water flood operation, it is usually advantageous to start the flooding operation in conventional manner by the injection of aqueous displacement fluid into one or more injection wells while recovering oil from one or more spaced production wells. The producing water/oil ratios are ascertained to determine the point of water breakthrough as evidenced by a sharp increase in the producing water/oil ratio. The volume of fluid injected to the point of water breakthrough is the water channel volume. After the breakthrough of water into the producing well, a permeability adjustment is made by treatment in the above-described manner and injection of displacement fluid resumed. The effectiveness of the treatment can be ascertained by noting an increase in injection pressure and by monitoring the producing water/oil ratio. Normally, the producing water/oil ratio will decrease as the more permeable water channels are at least partially plugged, and then again increase on continued injection as the displacement fluid breaks through other channels. Subsequent periodic treatments may be advantageous after the producing water/oil ratio again substantially increases.

The volume of treating fluid injected depends upon the characteristics of the particular formation subjected to treatment, the total quantity of reactants injected, and their solubilities, and can best be ascertained by experience gained from prior treatments of the subject formation. Suggested prior art computational methods of determining the volumes of spacer fluid required are largely unsatisfactory because of the nonuniform configuration of each particular formation. However, approximations of the fluid volumes can be made from experience gained in the treatment of similar formations and from laboratory model studies. While the treating fluid volume is preferably determined from field experience, the total fluid volume required in a conventional water flooding operation including the inert spacer fluid injected between the two reactive fluids is normally less than about 33 percent of the initial channel volume and usually less than about 20 percent of this volume. In a typical flooding operation, the total volume of treating fluids injected for a single treatment is usually between about 100 barrels and 1,000 barrels, although both smaller and larger treatments are within the scope of this invention.

The total quantity of reactants injected in each treatment should be at least stoichiometrically equivalent, and more preferably when using a polyvalent metal reactant and a thickener reactive with polyvalent metal ions, it is desirable to employ an excess of polyvalent metal salt to allow for the quantity of this reactant which reacts with the thickener.

The method of conducting a water shutoff treatment is substantially similar to the treating technique disclosed above in conjunction with a water flooding operation. An initial injection of water or brine to displace oil away from the well bore is usually preferred, followed by injection of the treating fluids in the above-described manner. The treating fluid is then displaced into the formation by a following injection of water or brine. After a short shutin period to allow for completion of the in situ reaction, the well can be returned to production in conventional manner.

The improved selective plugging method of this invention and the substantially improved performance resulting therefrom is demonstrated by the following examples which are presented by way of illustration, and are not intended as limiting the spirit or scope of the invention as defined by the appended claims.

EXAMPLE NO. 1

The selective plugging of the more water permeable channels of an oil-containing structure by one preferred prior art method is illustrated by the following laboratory test. A synthetic core of Nevada No. 140 sandstone having a diameter of 1 inch and a length of 12 inches is saturated with a dyed oil having a viscosity of 62.0 cps. This core exhibits an air permeability of 17,600 md. and a pore volume of 75.05 ml. Oil saturation is 68.0 ml. (90.6%) and water saturation is 7.05 ml. (9.4%). The oil saturated core is mounted in a horizontal position in a conventional core holder and flooded with 3.0% brine. The effluent displaced from the core is collected and the respective oil and water recovery periodically determined. The oil and water recoveries at various volumes of displacing fluid injection are reported in Table 1.

The injection of 0.91 pore volume of displacement fluid results in the recovery of 23.8% of the oil in place. However, because of water channeling through the more permeable zones of the core, the producing water/oil ratio is increased to the value of 11.4. The first permeability adjustment is performed during cut No. 8 by the successive injection of 2 ml. of 10% sodium carbonate solution, 5 ml. of 3.0% brine, and 1 ml. of 20% ferric chloride solution. Displacement fluid injection is continued with the result that the more permeable water channels become at least partially plugged as evidenced by decrease of the producing water/oil to the value of 0.9. Second and third plugging treatments are performed upon the producing water/oil ratio subsequently reaching undesirably high values. The third plugging treatment effects little change in the producing water/oil ratio.

With the prior art selective plugging method practiced in the foregoing manner, a total of 63.8% of the in place oil is recovered by the injection of 6.73 pore volumes of displacement fluid. The oil and water recoveries for each cut are reported in Table 1.

TABLE NO. 1.—OIL RECOVERY BY BRINE DISPLACEMENT USING CONVENTIONAL SELECTIVE PLUGGING

| Cumulative volume displacement fluid injected | | Oil Produced | | Water produced, ml. | Producing water/oil ratio |
|---|---|---|---|---|---|
| Ml. | Pore vol. | Ml. | Percent recovery | | |
| 9.2 | 0.12 | 6.7 | 10.2 | 2.5 | 0.4 |
| 19.0 | 0.25 | 2.6 | 13.7 | 7.2 | 2.8 |
| 28.8 | 0.38 | 1.8 | 16.3 | 8.0 | 4.4 |
| 38.6 | 0.51 | 1.5 | 18.5 | .8.3 | 5.5 |
| 48.6 | 0.65 | 1.4 | 20.6 | 8.6 | 6.1 |
| 58.5 | 0.78 | 1.3 | 22.5 | 8.6 | 6.6 |
| 68.7 | 0.91 | 0.9 | 23.8 | 9.3 | 10.3 |
| ¹ 78.6 | 1.05 | 0.8 | 25.0 | 9.1 | 11.4 |
| 88.5 | 1.18 | 1.0 | 26.5 | 8.9 | 8.9 |
| 98.5 | 1.31 | 5.4 | 34.4 | 4.6 | 0.9 |
| 108.6 | 1.45 | 2.2 | 37.6 | 7.9 | 3.6 |
| 118.4 | 1.58 | 1.6 | 40.0 | 8.2 | 5.1 |
| 128.2 | 1.71 | 1.8 | 42.7 | 8.0 | 4.4 |
| 138.1 | 1.84 | 1.0 | 44.1 | 8.9 | 8.9 |
| 148.0 | 1.97 | 0.8 | 45.3 | 9.1 | 11.4 |
| 157.9 | 2.10 | 0.6 | 46.1 | 9.3 | 15.5 |
| ² 167.9 | 2.24 | 0.6 | 47.0 | 9.4 | 15.7 |
| 177.9 | 2.37 | 0.6 | 47.9 | 9.4 | 15.7 |
| 187.8 | 2.50 | 0.3 | 48.3 | 9.6 | 32.0 |
| 197.9 | 2.64 | 0.3 | 48.8 | 9.8 | 32.6 |
| 207.8 | 2.77 | 0.5 | 49.5 | 9.4 | 18.8 |
| 217.7 | 2.90 | 0.5 | 50.2 | 9.4 | 18.8 |
| 228.2 | 3.04 | 0.6 | 51.2 | 9.9 | 16.5 |
| ³ 238.2 | 3.17 | 0.5 | 51.9 | 9.5 | 19.0 |
| 263.2 | 3.50 | 1.1 | 53.5 | 23.9 | 21.7 |
| 288.1 | 3.84 | 1.1 | 55.1 | 23.8 | 21.6 |
| 506.1 | 6.73 | 6.0 | 63.8 | 212.0 | 35.3 |

¹ First plugging treatment injected during this cut.
² Second plugging treatment injected during this cut.
³ Third plugging treatment injected during this cut.

EXAMPLE NO. 2

The use of the improved plugging method of this invention to selectively plug the more permeable water channels of an oil-containing structure during a water flood operation is simulated by the following laboratory test using a synthetic core of Nevada No. 140 sandstone having a diameter of 1 inch and a length of 12 inches. The core exhibits an air permeability of 17,660 md. and has a pore volume of 70.0 ml. The core is saturated with a dyed oil having a viscosity of 62.0 cps. and mounted in a horizontal position in a commercial core holder. Oil saturation is 63.9 ml. (91.3%) and water saturation is 6.1 ml. (8.7%). The core is flooded with 3.0% brine by the technique used in Example 1. Similarly, the effluent displaced from the core is collected and the respective oil and water recovery periodically determined. The respective oil and water recoveries at various volumes of displacing fluid injection are reported in Table 2.

A total of 32.5% of the oil in place is recovered by the injection of 1.46 pore volume of displacement fluid. However, because of water channeling through the more permeable zones of the core, the producing water/oil ratio is increased to 10.8. A first selective plugging treatment is performed according to the method of this invention by injecting 2 ml. of 10% sodium carbonate in a thickened water solution. The water is thickened by the addition of 0.60 weight percent Dow Chemical Company ET-601 polyacrylamide. The viscous sodium bicarbonate solution is immediately followed by injection of 4 ml. of 3% brine and 1 ml. of 20% ferric chloride solution. Displacement fluid injection is continued with the result that the more permeable water channels become at least partially plugged as evidenced by a decrease in the producing water oil ratio. Second and third plugging treatments are performed when the producing water oil ratio subsequently reaches undesirably high values. Oil recovery is 74.2% after 6.5 pore volumes of injection, a 10% increase over the conventional method of Example 1.

TABLE NO. 2.—OIL RECOVERY BY BRINE DISPLACEMENT USING VISCOUS SELECTIVE PLUGGING

| Cumulative volume displacement fluid injected | | Oil Produced | | Water produced, ml. | Producing water/oil ratio |
|---|---|---|---|---|---|
| Ml. | Pore vol. | Ml. | Percent recovery | | |
| 10.0 | 0.14 | 6.0 | 9.4 | 4.0 | 0.7 |
| 19.9 | 0.28 | 2.6 | 13.4 | 7.3 | 2.8 |
| 29.7 | 0.42 | 2.3 | 17.1 | 7.5 | 3.3 |
| 42.1 | 0.60 | 2.3 | 20.7 | 10.1 | 4.4 |
| 52.0 | 0.74 | 1.8 | 23.5 | 8.1 | 4.5 |
| 62.0 | 0.89 | 1.6 | 26.0 | 8.4 | 5.3 |
| 72.0 | 1.03 | 1.3 | 28.0 | 8.7 | 6.7 |
| 82.05 | 1.17 | 1.05 | 29.7 | 9.0 | 8.6 |
| 92.05 | 1.32 | 0.95 | 31.2 | 9.05 | 9.5 |
| 102.05 | 1.46 | 0.85 | 32.5 | 9.15 | 10.8 |
| ¹ 112.25 | 1.60 | 0.70 | 33.6 | 9.50 | 13.6 |
| 122.05 | 1.75 | 1.75 | 36.3 | 8.05 | 4.6 |
| 132.15 | 1.89 | 3.30 | 41.5 | 6.80 | 2.1 |
| 142.65 | 2.04 | 2.25 | 45.0 | 8.25 | 3.7 |
| 152.85 | 2.18 | 1.50 | 47.4 | 8.70 | 5.8 |
| 163.0 | 2.33 | 2.30 | 50.9 | 7.85 | 3.4 |
| 173.0 | 2.47 | 1.10 | 52.7 | 9.20 | 8.4 |
| 183.5 | 2.62 | 0.90 | 54.1 | 9.30 | 10.4 |
| 193.4 | 2.76 | 0.75 | 55.3 | 9.15 | 12.2 |
| ² 203.6 | 2.91 | 0.65 | 56.3 | 9.55 | 14.7 |
| 213.6 | 3.05 | 0.60 | 57.2 | 9.40 | 15.7 |
| 224.0 | 3.20 | 0.70 | 58.3 | 9.70 | 13.9 |
| 234.05 | 3.35 | 0.95 | 58.8 | 9.10 | 9.6 |
| 244.25 | 3.50 | 0.80 | 61.1 | 9.40 | 11.8 |
| 254.25 | 3.64 | 0.80 | 62.3 | 9.20 | 11.5 |
| 264.65 | 3.79 | 0.70 | 63.3 | 9.60 | 13.7 |
| 274.75 | 3.93 | 0.80 | 64.6 | 9.30 | 11.6 |
| 284.70 | 4.07 | 0.75 | 65.8 | 9.20 | 12.3 |
| ³ 294.45 | 4.21 | 0.65 | 66.8 | 9.10 | 14.0 |
| 304.25 | 4.36 | 0.60 | 67.7 | 9.20 | 15.3 |
| 314.15 | 4.49 | 0.50 | 68.8 | 9.40 | 18.8 |
| 324.05 | 4.63 | 0.60 | 69.6 | 9.30 | 15.5 |
| 332.75 | 4.76 | 0.30 | 70.0 | 8.40 | 28.0 |
| 343.05 | 4.90 | 0.45 | 70.7 | 9.85 | 21.9 |
| 352.95 | 5.05 | 0.20 | 71.8 | 9.70 | 48.5 |
| 452.95 | 6.46 | 2.0 | 74.2 | 98.00 | 49.0 |

¹ First plugging treatment during this cut.
² Second plugging treatment during this cut.
³ Third plugging treatment during this cut.

EXAMPLE NO. 3

The selective plugging technique of this invention is employed to effect permeability adjustment in a formation being subjected to water flooding on a field test scale. The test program involved two injection wells and a producing well arranged in a triangular pattern of about 525 foot spacings. These wells are completed in the Third Pliocene zone, at a depth of about 3,800 feet.

After water flooding had been in progress for several months, severe water channeling developed between the injection wells and the producer. With a water injection rate of 350 barrels per day into each of the two injection wells, production averaged 820 barrels per day gross and 70 barrels per day net oil. Channeling was confirmed by the injection of a tracer into the first injection well. This tracer appeared within the producing well within two days. A different tracer into the second injection well required seven days to traverse the distance to the producing well.

Treating solutions are prepared and stored in field tanks at the well site. The first viscous solution (Solution A) is prepared by mixing 20,000 pounds of 37 percent by weight sodium silicate solution (41 barrels), 105 pounds of Dow Chemical Company ET-601 polyacrylamide, and 34 barrels of water. The low viscosity reactive solution (Solution B) is prepared by dissolving 9,000 pounds of commercial ferrous sulfate ($FeSO_4 \cdot 7H_2O$) in 170 barrels of water.

Injection well No. 1 is treated by interrupting the water flood to inject the treating solutions. The first chemical solution is preceded by an injection of 100 barrels of water at a high rate to build up the bottom hole pressure. Twenty-five barrels of viscous Solution A is then injected at a rate of 10 gallons per minute. This reduction in rate allowed the tight zones to bleed back so as to force the high permeability channels to take most of the viscous solution. The injection of Solution A is followed by 50 barrels of water spacer fluid injected at a high rate and then by 40 barrels of Solution B at 10 gallons per minute. The injection of flood water is then resumed at the rate of 10 gallons per minute.

After a short time interval, the injection pressure increased from 760 p.s.i. at 350 barrels per day to 820 p.s.i. at the same rate. Second and third successive plugging treatments are performed according to the method of the first treatment. The second treatment comprises 50 barrels of Solution A, 25 barrels of water, and 80 barrels of Solution B. The third solution comprises 62 barrels of Solution A, 10 barrels of water, and 100 barrels of Solution B. After the third treatment, the injection pressure increased to 1020 p.s.i.g. at 350 barrels per day injection rate. Within several days of the treatment, gross production decreased to 730 barrels per day and oil production increased to 90 barrels per day.

EXAMPLE NO. 4

The selective plugging treatment of this invention is used to selectively plug the water channels of a well producing 25 barrels per day of oil and 237 barrels per day of water. After a chemical treatment substantially in accordance with the treatment of Example 3 in connection with a water flooding operation, the well was returned to production in conventional manner. Oil production increased to 32 barrels per day and water production decreased to 133 barrels per day.

While particular embodiments of the invention have been described, it will be understood, of course, that the invention is not limited thereto since many modifications can be made, and it is intended to include within the invention any such modifications as fall within the scope of the claims.

The invention having thus been described, I claim:

1. A method for selectively plugging the permeable water channels of a subterranean formation of nonuniform permeability penetrated by a well, which comprises:
   introducing a viscous aqueous solution of a first reactant into said well communicating with said formation, said solution containing a viscosity increasing agent added in an amount sufficient to render the solution substantially more viscous than the subsequently injected liquids;
   introducing a low viscosity inert aqueous spacer liquid into said well immediately following said viscous solution;
   introducing a low viscosity aqueous solution containing a second reactant which on contact will react with said first reactant to produce an insoluble precipitate; and
   displacing said fluids into said formation a distance from said well.

2. The method defined in claim 1 wherein the amount of said second reactant injected is at least stoichiometrically equivalent to the amount of said first reactant injected.

3. The method defined in claim 1 wherein said low viscosity liquids have viscosities of about 1 centipoise and wherein said viscous aqueous solution has a viscosity within the range of from about 5 to about 100 centipoises.

4. The method defined in claim 1 wherein said viscosity increasing agent is partially hydrolyzed polyacrylamide.

5. The method defined by claim 1 wherein at least a portion of said viscosity increasing agent is absorbed onto the walls of the pores of said formation.

6. The method defined in claim 1 wherein said second reactant is reactive with said viscosity increasing agent, and wherein the amount of said second reactant added to said low viscosity aqueous solution is in excess of the amount stoichiometrically equivalent to the amount of first reactant injected in said viscous aqueous solution.

7. The method defined in claim 1 wherein said first reactant is sodium carbonate and wherein said second reactant is ferric chloride.

8. The method defined in claim 1 wherein said first reactant is sodium silicate and wherein said second reactant is ferrous sulphate.

9. The method defined in claim 1 wherein said viscous aqueous solution contains about 5 to 20 percent sodium carbonate and sufficient viscosity increasing agent to increase the viscosity of said solution to a value within the range of from about 5 to about 100 centipoises, and wherein said low viscosity aqueous solution contains about 5 to 30 percent by weight ferric chloride.

10. The method defined in claim 1 wherein said viscous aqueous solution contains about 5 to 25 percent by weight sodium silicate and sufficient viscosity increasing agent to increase the viscosity of said solution to a value within the range of about 5 to about 100 centipoises, and wherein said low viscosity aqueous solution contains at least about 5 percent by weight ferrous sulfate.

11. In the recovery of oil from a subterranean oil-bearing formation of nonuniform permeability by flooding the formation with an aqueous displacement fluid injected under pressure through an injection well so as to drive oil toward at least one spaced production well, an improved method of selectively adjusting the permeability of the formation which comprises:
discontinuing the injection of displacement fluid;
injecting a viscous aqueous solution of a first reactant through said injection well, said solution containing a viscosity increasing agent added in an amount sufficient to render the solution substantially more viscous than the subsequently injected liquids;
injecting a low viscosity inert aqueous spacer liquid into said well immediately following the injection of said viscous solution;
injecting a low viscosity aqueous solution of a second reactant which on contact with said first reactant will react to produce a water-insoluble precipitate; and
resuming the injection of displacement fluid.

12. The method defined in claim 11 wherein the amount of said second reactant injected is at least stoichiometrically equivalent to the amount of said first reactant injected.

13. The method defined in claim 11 wherein said low viscosity liquids have viscosities of about 1 centipoise and wherein said viscous aqueous solution has a viscosity within the range of from about 5 to about 100 centipoises.

14. The method defined in claim 11 wherein said viscosity increasing agent is partially hydrolyzed polyacrylamide.

15. The method defined in claim 11 wherein said first reactant is sodium carbonate and wherein said second reactant is ferric chloride.

16. The method defined in claim 11 wherein said first reactant is sodium silicate and wherein said second reactant is ferrous sulfate.

17. The method defined in claim 11 wherein said second reactant also reacts with said viscosity increasing agent to form a water insoluble precipitate.

18. The method defined in claim 11 wherein said viscous aqueous solution contains about 5 to 20 percent sodium carbonate and sufficient viscosity increasing agent to increase the viscosity of said solution to a value within the range of from about 5 to about 100 centipoises, and wherein said low viscosity aqueous solution contains about 5 to 30 percent by weight ferric chloride.

19. The method defined in claim 11 wherein said viscous aqueous solution contains about 5 to 25 percent by weight sodium silicate and sufficient viscosity increasing agent to increase the viscosity of said solution to a value within the range of about 5 to about 100 centipoises, and wherein said low viscosity aqueous solution contains at least about 5 percent by weight ferrous sulfate.

20. In the recovery of oil from a subterranean oil-bearing formation of nonuniform permeability by flooding the formation with an aqueous displacement fluid injected under pressure through an injection well so as to drive oil toward at least one spaced production well, an improved method of selectively adjusting the permeability of the formation which comprises:
discontinuing the injection of displacement fluid;
injecting a viscous aqueous solution of an alkaline reactant containing sufficient added partially hydrolyzed polyacrylamide to increase the viscosity of the solution to a value within the range of from about 5 to about 100 centipoises;
injecting a low viscosity inert aqueous spacer liquid into said well immediately following the injection of said viscous solution;
injecting a low viscosity aqueous solution of a second reactant which on contact will react to produce a water insoluble precipitate; and
displacing said injected fluids into said formation.

References Cited
UNITED STATES PATENTS

| | | | |
|---|---|---|---|
| 2,272,672 | 2/1942 | Kennedy | 166—29 X |
| 2,747,670 | 5/1956 | King et al. | 166—21 |
| 2,807,324 | 9/1957 | King et al. | 166—29 |
| 2,827,964 | 3/1958 | Sandiford et al. | 166—9 |
| 2,837,163 | 6/1958 | Ramos et al. | 166—10 |
| 3,013,607 | 12/1961 | Bond et al. | 166—10 |
| 3,308,885 | 3/1967 | Sandiford | 166—9 X |
| 3,342,262 | 9/1967 | King et al. | 166—29 |

STEPHEN J. NOVOSAD, *Primary Examiner.*